US006915101B2

(12) United States Patent
Goldman et al.

(10) Patent No.: US 6,915,101 B2
(45) Date of Patent: Jul. 5, 2005

(54) DEVICE AND METHOD FOR FIXING A TONER IMAGE USING A DIRECTED STREAM OF SOLVENT VAPOR

(75) Inventors: Gerd Goldman, Munich (DE); Frank Keidel, Munich (DE); Peter Segerer, Olching (DE); Günter Rosenstock, Ottobrunn (DE)

(73) Assignee: OcéPrinting Systems GmbH, Poing (DE)

( * ) Notice: Subject to any disclaimer, the term of this patent is extended or adjusted under 35 U.S.C. 154(b) by 35 days.

(21) Appl. No.: 10/343,426

(22) PCT Filed: Jul. 31, 2001

(86) PCT No.: PCT/EP01/08863

§ 371 (c)(1),
(2), (4) Date: May 27, 2003

(87) PCT Pub. No.: WO02/10862

PCT Pub. Date: Feb. 7, 2002

(65) Prior Publication Data

US 2003/0185607 A1 Oct. 2, 2003

(30) Foreign Application Priority Data

Aug. 1, 2000 (DE) ........................................ 100 37 464

(51) Int. Cl.[7] ........................ G03G 15/20; G03G 13/20; G05D 3/10; G05D 3/04

(52) U.S. Cl. .................... 399/340; 427/335; 427/372.2; 430/124

(58) Field of Search ................................ 399/340, 320, 399/335; 396/564, 571, 574, 579; 427/335, 372.2; 430/124

(56) References Cited

U.S. PATENT DOCUMENTS

| | | | | |
|---|---|---|---|---|
| 3,199,223 A | * | 8/1965 | Carlson | 399/340 |
| 3,680,795 A | | 8/1972 | Galitz | |
| 4,311,723 A | | 1/1982 | Mugrauer | |
| 4,503,625 A | * | 3/1985 | Manzer | 399/340 |

FOREIGN PATENT DOCUMENTS

| | | |
|---|---|---|
| CH | 457 144 | 7/1968 |
| DE | 26 13 066 | 9/1977 |
| DE | 27 20 247 | 11/1978 |
| DE | 29 27 453 | 1/1981 |
| DE | 36 36 324 | 4/1988 |
| DE | 198 27 210 | 12/1999 |
| EP | 0 613 572 | 7/1995 |
| EP | 0 784 238 | 7/1997 |
| EP | 0 629 930 | 5/1998 |
| EP | 197 55 584 | 6/1999 |
| WO | WO 98/24003 | 4/1998 |

OTHER PUBLICATIONS

IBM Technical Disclosure Bulletin—vol. 32, No. 3A Aug. 1989.

* cited by examiner

*Primary Examiner*—Arthur T. Grimley
*Assistant Examiner*—Ryan Gleitz
(74) *Attorney, Agent, or Firm*—Schiff Hardin LLP

(57) ABSTRACT

In a vapor fixing device for an electrographic printer or copier, the heated vapor housing is provided such that vapor does not condense at the interior housing walls. A directed stream containing solvent vapor is produced which is directed at a section of the support material.

50 Claims, 16 Drawing Sheets

DEVICE AND METHOD FOR FIXING A TONER IMAGE USING A DIRECTED STREAM OF SOLVENT VAPOR

BACKGROUND OF THE INVENTION

The invention is directed to a device and to a method for fixing a toner image on a carrier material, whereby the toner image is charged with a solvent vapor. The invention is also directed to an apparatus for printing and/or copying wherein such a device is utilized.

In numerous electrophotographic printing or copying processes, a toner image is transferred onto a carrier material, for example paper, the toner image being initially not joined to the carrier material in smear-proof and abrasion-resistant fashion. That the toner image is firmly joined to the carrier material, i.e. fixed, is only achieved by a fixing process. A fixing process is usually employed wherein the toner is charged with heat and pressure. The toner is thereby melted with the assistance of heating fixing drums and pressed into the carrier material, so that the toner enters into a bonded union with the carrier material. When no specific pre-heating of the paper is undertaken, this heat-pressure fixing is limited to the transport velocity of the carrier material, for example to approximately 0.5 m/s through 0.7 m/s.

When the carrier material is simultaneously printed on both sides in the operating mode of duplex printing and both sides are to be simultaneously fixed, then fixing drums that are soft and yielding must be employed at both sides. Such fixing drums have only a short service life and, due to the slight economic feasibility, are only utilized in printers or copiers having a low printing volume. Due to the resilience of the fixing drums, further, the guidance of the carrier material is problematic, so that an endless carrier material web can only be conditionally employed given such a fixing method.

Contactless fixing methods have already been proposed that avoid the problems arising due to the contact between carrier material and parts of the fixing mechanism, for example the fixing drums.

EP-A-0 629 930 discloses an arrangement wherein toner is melted with infrared radiation and is fixed on the paper. Such an arrangement can also be employed in duplex printing, whereby toner images are simultaneously fixed on both sides of the carrier material. When switched on and off, the infrared radiators that are employed have a relatively great time constant, so that a start/stop mode cannot be realized with such an arrangement without spoilage or rejects.

DE-A-198 27 210 discloses an arrangement wherein infrared radiation is likewise employed for fixing. A start/stop mode without rejects can be realized by means of the design control of a blind that is inserted into and in turn withdrawn from the beam path of the infrared radiation. However, the general disadvantage of fixing with the assistance of infrared radiation remains, this being comprised such that the carrier material, generally paper, is relatively intensely dried during the fixing event, this leading to a shrinkage, to ripple and to an electrostatic charging given further-processing and post-processing of the carrier material. Such a modification of the carrier material can lead to considerable problems in the post-processing of the carrier material, for example when cutting, stacking, binding, enveloping, etc.

Another known contactless fixing method is photoflash fixing wherein the toner is fixed on the carrier material with high-energy light pulses. The wavelength of the radiation generally lies in the visible through ultraviolet range of the radiation spectrum. Photoflash fixing reacts sensitively to the color of the toner, i.e. the toner material absorbs the energy dependent on the existing light spectrum, which can lead to quality losses given employment of toners having different color, for example in multi-color printing.

Another contactless fixing method is what is referred to as cold fixing. In this cold fixing, the toner material is softened under the influence of a solvent. The softened toner thereby moistens the carrier material. Given employment of fiber material that contains fibers such as, for example, paper or textiles, the softened toner surrounds the fibers and, due to capillary forces, penetrates between the fibers and into them. After the evaporation of the solvent, the toner in turn congeals and solidifies. In this way, the toner is joined to the carrier material in a smear-proof and abrasion-resistant manner. The presence of the solvent in vapor form during the fixing process is more advantageous than the presence as an aerosol or liquid, since chemical solvent processes sequence on a molecular basis and a molecular distribution of the solvent is thus the most suitable. Given the employment of vapor, moreover, a condensation of the solvent vapor onto the toner particles occurs due to the different temperatures of carrier material and vapor, so that the vapor molecules deposit directly onto these toner particles. Moreover, the output of the evaporation enthalpy in the condensation supports the softening of the toner and increases the speed of the dissolving process.

A general advantage of fixing with the assistance of a solvent is the slight thermal stressing of the carrier material. Accordingly, carrier materials can be employed that withstand only a slight thermal or mechanical load such as, for example, labels or films. Moreover, the moisture content of the carrier material is not changed, so that a ripple, a bagging or a curling arising due to changes in moisture are avoided. Moreover, cold fixing is largely independent of the thickness of the carrier material, so that, for example, papers having different paper thicknesses can be employed without a great modification of the fixing process. In this way, a change in the type of paper can also occur with little expense.

U.S. Pat. No. 4,311,723 discloses an arrangement wherein a paper web is conducted through a fixing chamber with solvent vapor. The solvent vapor is situated in a container. Due to the force of gravity as well as cooling tubes in the upper region of the container, the concentration of the solvent vapor increases toward the floor of the container, so that a region with a high solvent concentration arises in the proximity of the container floor. The carrier material, which enters in the upper region of the container with the as yet unfixed toner images, is deflected downward at a first deflection device and is conducted in the region of the high solvent concentration in the proximity of the container floor. The carrier material with partially fixed toner images is deflected again thereat at a second deflection device and is ultimately conducted upward out of the container via a third deflection device. Of necessity, a touching of the carrier material occurs at the deflection devices, as a result whereof the toner situated thereon can smear or peel off or print locations are left behind. It is therefore not possible with this arrangement to fix carrier material charged with toner images on both sides. Moreover, the arrangement exhibits a relatively slow start/stop behavior since—for stopping the fixing—the deflection device must be moved out of the region of high solvent concentration upward into a region having a low solvent concentration with which a fixing no longer occurs, a certain time being required for this.

The employment of solvent can be problematical in view of the creation of ozone. One speaks of the ozone potential of a solvent in this context. In U.S. Pat. No. 4,311,723, an azeotropic mixture of tri-chlorofluorethane ($C_2Cl_2F_3$, CFC1130 and acetone ($C_6H_6O$) is employed. The primary solvent is the acetone, whereas the CFC113 serves as a flame retardant. The use of CFC113 was outlawed in the earlier 1990*s* due to the high ozone potential. Partially halogenated hydrocarbons, what are referred to as HCFC, were then proposed as a replacement for the CFC113, for example HCFC123 and HCFC141b, since these have a significantly lower ozone potential. These partially halogenated hydrocarbons HCFC henceforth assumed the function of the flame retardant in mixtures of air and combustible solvents such as acetone, propyl alcohols, etc. In particular, the use of pure HCFC141b without addition of a solvent such as, for example, acetone proved advantageous given employment of polystyrol-based toners since HCFC141b has an adequate fixing action for these toners and is simple to recover as a single-phase material since no mixing or de-mixing problems occur.

Due to its ozone potential and the environmental pollution produced as a result thereof, however, HCFC141b will only be available for a limited time. New fixative mixtures on the basis of chlorine-free, fully halogenated hydrocarbons HFC were therefore proposed, for example in EP-A-0 784 238 (Solvay) and EP-A0 941 503 (Allied Signal). Given the polyester based toners that are usually employed now, however, these mixtures have proven problematic to employ in practice.

EP-A-0 613 572 discloses a method and a solvent for fixing a toner constructed on the basis of polystyrol. A partially halogenated fluorohydrocarbon having a temperature of ebullition below 35° C. is employed as sole a solvent.

DE-A-2 720 247 discloses a printing process wherein toner is transferred from an intermediate carrier, for example a photoconductor drum onto a recording medium at a transfer printing station. The toner on the photoconductor drum is charged with a solvent vapor such that it becomes sticky. The recording medium, for example the paper, is likewise exposed to the solvent vapor. The sticky toner adheres on the paper, which is likewise provided with solvent, as a result whereof the transfer printing event and the fixing of the toner occur in a single process.

DE-A-2 613 066 discloses a fixing process for fixing toner images on paper. Hot gas with a predetermined proportion of water steam is employed for the non-contacting fixing.

DE-A-2 613 066 also discloses a fixing device wherein the toner material of the toner image on the recording medium is charged with a hot gas, particularly air. The temperature of this gas is such that the toner melts and penetrates into the recording medium, for example paper.

The following documents are cited in the International Search Report: CH,A,457 144; U.S. Pat. No. 3,680,795; "Cut-Sheet Vapor Fuser", IBM Technical Disclosure Bulletin, IBM Corp. New York 32 (3A), 1989, 258–259, XP000049471; DE,A,29 27 453; DE,A,36 36 324, with CH, A, 457144 being relevant.

SUMMARY OF THE INVENTION

An object of the invention is to specify a device and a method that enables a fixing of toner images with high efficiency given low environmental pollution. This object is achieved by providing a method and apparatus wherein a vapor fixing is provided such that vapor does not condense at interior housing walls.

Exemplary preferred embodiments of the invention are explained below on the basis of the drawing, whereby known fixing mechanisms are also referenced.

DESCRIPTION OF THE PREFERRED EMBODIMENT

Figure 1:
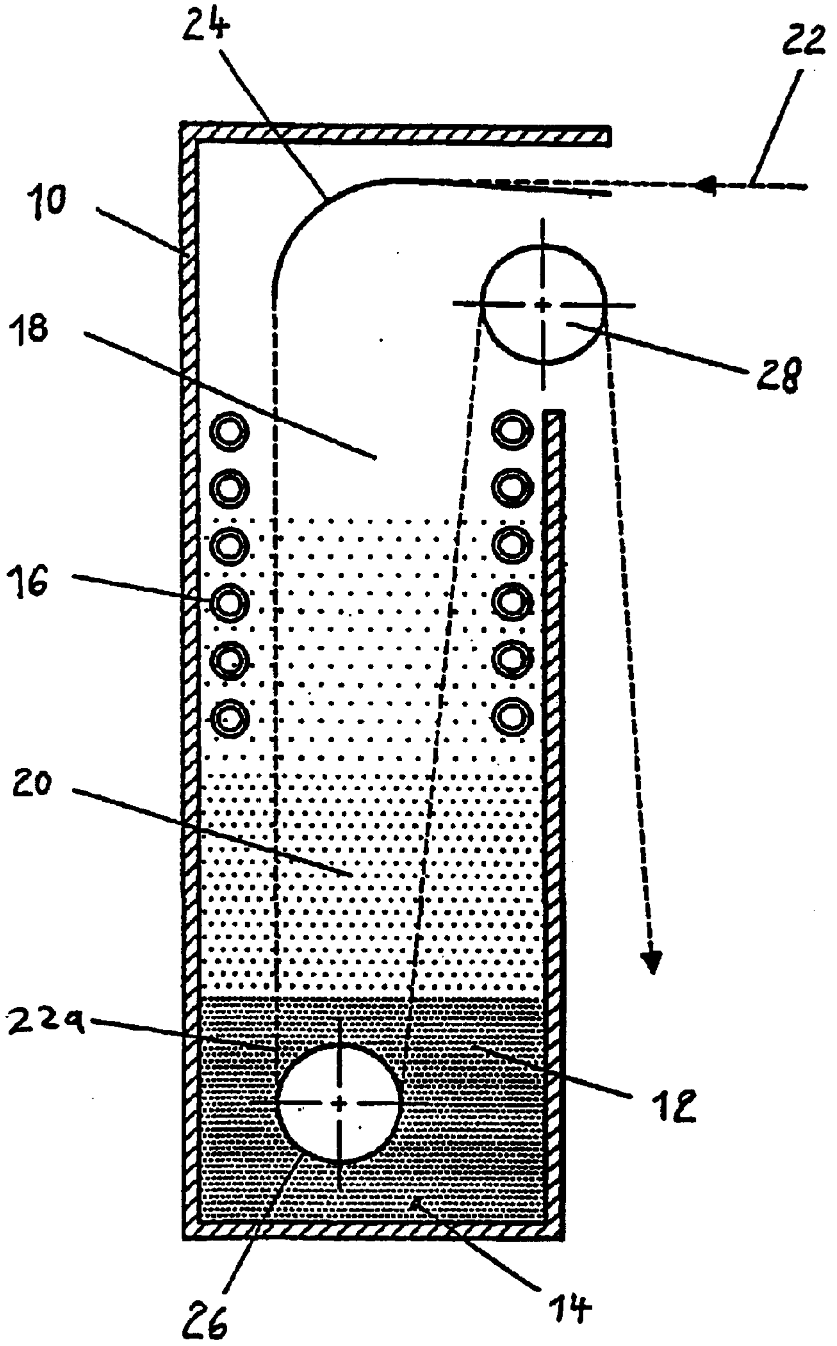
Fig. 1 (PRIOR ART)
FIG. 1 shows a known fixing device with solvent vapor that is largely at rest.

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, such alterations and further modifications in the illustrated device, and/or method, and such further applications of the principles of the invention as illustrated therein being contemplated as would normally occur now or in the future to one skilled in the art to which the invention relates.

FIG. 1 shows the structure of a traditional fixing device similar to that according to the aforementioned U.S. Pat. No. 4,311,723. In order to understand the exemplary preferred: embodiments of the invention better, this known fixing device shall be discussed first. A solvent vapor 12 is generated in a container 10. Cooling tubes 16 that cool the solvent vapor are arranged inside the container 10. Accordingly, the solvent concentration in the upper region 18 is lower than in a middle region 20 and is in turn lower in the middle region 20 than in the floor region 14. The highest solvent concentration is thus encountered on the portion 22*a* of the web 22 in this floor region 14. The carrier material 22, generally a paper web, with as yet unfixed toner images, enters horizontally into the container 10 and is deflected vertically downward at a first deflection device 24 and is guided into the region of high solvent concentration in the floor region 14. The toner images are partially fixed over this path of the paper web 22. The paper web 22 is deflected again at a second deflection device 26 and is ultimately conducted out of the container 10 via a third deflection device 28.

Of necessity, contact between the paper web 22 and the deflection elements occur at the deflection devices 24, 26 and 28. Due to this contact, particularly at the elements 24 and 26, the toner can smear or come off and/or print locations can remain behind on the paper web 22. A double-sided, simultaneous fixing of toner images on both sides of the paper web 22, as would be necessary given the operating mode of duplex printing, is not possible since the toner on the back side would already be smeared at the first deflection device 24. Moreover, the still soft toner could in turn be partially stripped off at the third deflection device 28.

The device shown in FIG. 1 also exhibits a relatively slow start/stop behavior when the paper web 22 is arrested during forward transport or resumes its transport velocity. For stopping the fixing process, the deflection device 26 is moved from the region with high solvent concentration, the floor region 14, upward into the upper region 18 with low solvent concentration at which the fixing process is greatly reduced. The travel motion consumes a relatively long time and thus defines the dynamic behavior of the overall fixing device.

Figure 2:
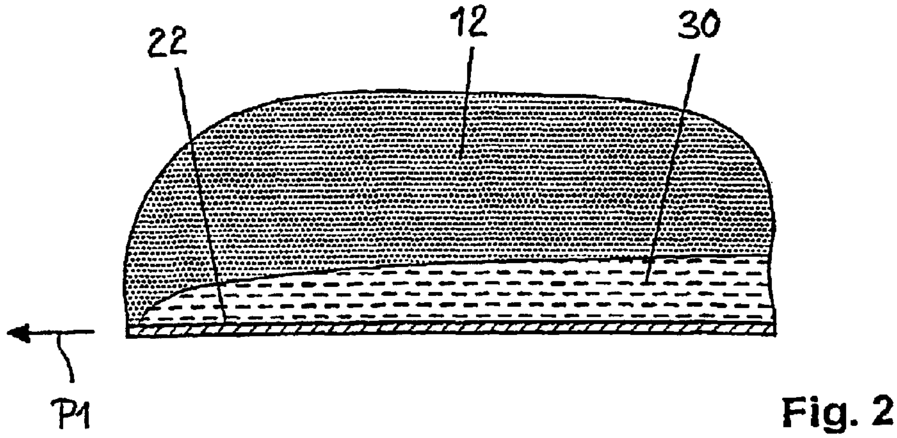
Fig. 2 (PRIOR ART)
FIG. 2 shows the structure of an inert air layer between the paper web and the solvent vapor.

FIG. 2 schematically shows an effect that arises due to the motion of the carrier material 22. It must be generally mentioned that paper is preferably employed as carrier material 22; however, other materials such as, for example, films, labels or plastics can also be employed. Given a movement of the paper web 22 in the direction of the arrow P1, air 30 is entrained from outside the fixing device. This air 30 is located as an inert layer between the paper web 22 and the solvent vapor 12, as a result whereof the fixing process is retarded since the solvent vapor 12 must first penetrate the air layer 30. This effect is dependent on the transport velocity of the paper web 22 and on the spatial geometry of the fixing device. This effect is especially pronounced when the solvent vapor 12 is at rest.

Figure 3:
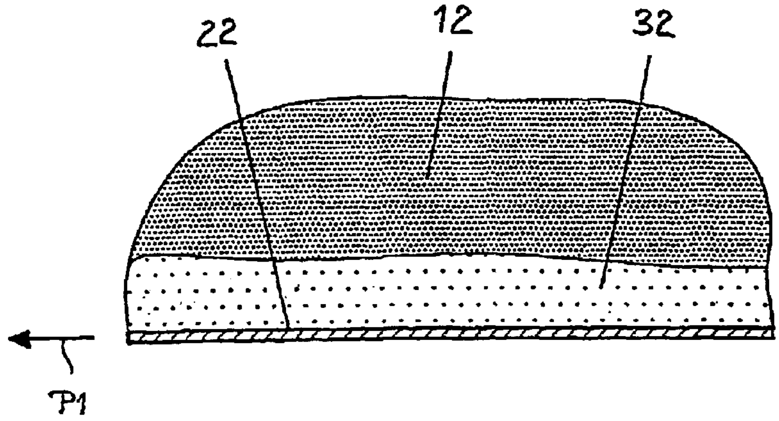
Fig. 3 (PRIOR ART)
FIG. 3 illustrates the effect of a solvent depletion.

FIG. 3 shows a further effect that particularly occurs when the solvent vapor 12 is at rest. The temperature of the paper web 22 generally lies below the temperature of ebullition of the solvent, so that the solvent vapor 12 condenses at the surface of the paper web 22. A solvent depletion occurs in a zone 32 close to the surface of the paper web 22, so that the surface of the paper web is separated from the highly concentrated solvent vapor 12 and the toner cannot be dissolved any further.

Figure 4:
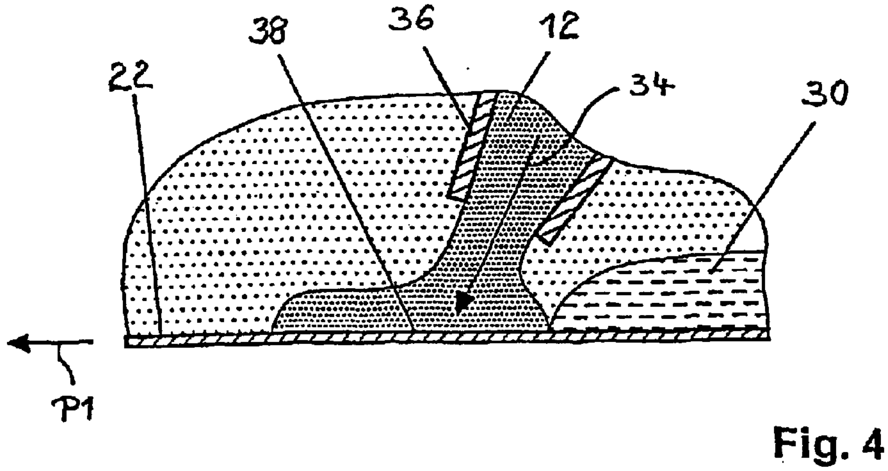
FIG. 4 illustrates the principle of blowing the carrier material with a directed stream in a preferred exemplary embodiment.

FIG. 4 shows the principle employed in the preferred embodiment. The surface of the carrier material, for example the paper web 22, is blown by a directed stream that contains solvent vapor 12. The stream 34 emerges from a nozzle 36. The stream 34 of solvent vapor 12 penetrates the inert air layer 30 and proceeds into a region 38 of the paper surface in order to dissolve the toner thereat.

The strong convection produced by the flow increases the probability that solvent molecules encounter toner particles during the transit time of the paper web 22 through the fixing device and dissolve the toner. The stream 34 is comprised of a mixture of air and solvent vapor. The zone 32 with solvent depletion shown in FIG. 3 cannot form due to the convection, since new solvent vapor 12 is continuously replenished. A high solvent concentration is thus always maintained at the location that is blown against. The effect of this blowing principle is that an adequate dissolving effect is achieved even given a slight chemical dissolving force and the required influencing time is shortened. By shortening this influencing time, the structural size of the fixing device can be diminished with a given paper velocity, or the paper velocity can be increased with a given structural size.

Figure 5:
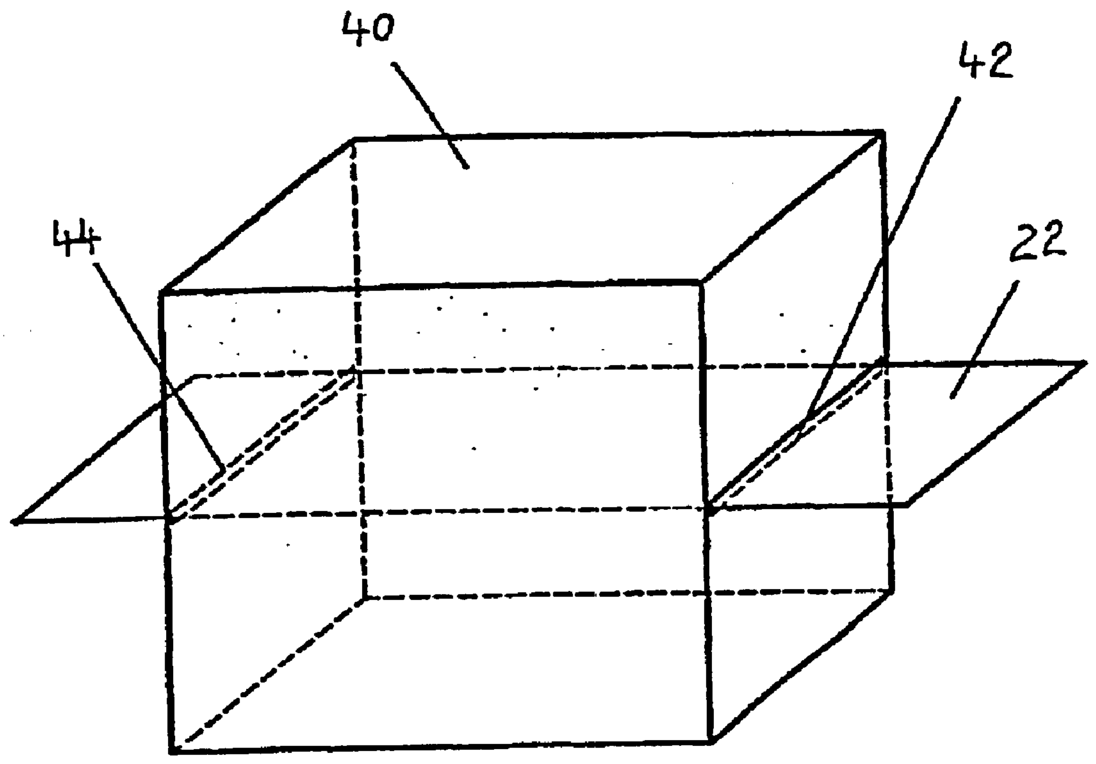
FIG. 5 illustrates the schematic structure of a fixing device in a preferred exemplary embodiment.

FIG. 5 schematically shows the structure of a fixing device [of the invention] for a simultaneous double-sided fixing of toner images on the carrier material 22. The fixing device comprises a fixing chamber 40 that has an essentially closed structure in order to prevent the active solvent vapor from being diluted with ambient air. The carrier material 22, generally a paper web, traverses the fixing chamber 40 straight and horizontally, whereby it passes through a first, narrow admission gap 42 and a narrow discharge gap 44 lying opposite the former. The admission gap 42 is designed such that no contact occurs between it and the carrier material 22 even when the web of material flutters or sags in order to avoid smearing the toner image situated on both sides of the carrier material 22. When the operating mode of "simplex printing" having only single-sided toner images on the carrier material 22 is applied, contact can occur at that side of the carrier material 22 lying opposite the toner images, and corresponding guide elements can be provided.

Due to the friction between ambient air and carrier material 22, air is entrained in the region of a boundary layer as a consequence of the transport motion of the carrier material 22. Upon entry of the carrier material 22 into the fixing chamber 40, ambient air is therefore also transported into the fixing chamber 40 through the admission gap 42. As a consequence of the movement of the carrier material 22, solvent vapor is entrained from the inside of the fixing chamber 40 at the discharge side toward the outside through the discharge gap 44. As a result of these effects, the solvent concentration in the inside of the fixing chamber is steadily reduced if this effect is not countered. In order to diminish this effect, first, the admission gap 42 and the discharge gap 44 are implemented optimally narrow; second, fresh solvent vapor is continuously resupplied into the fixing chamber 40 from an evaporator during the fixing process.

Figure 6:
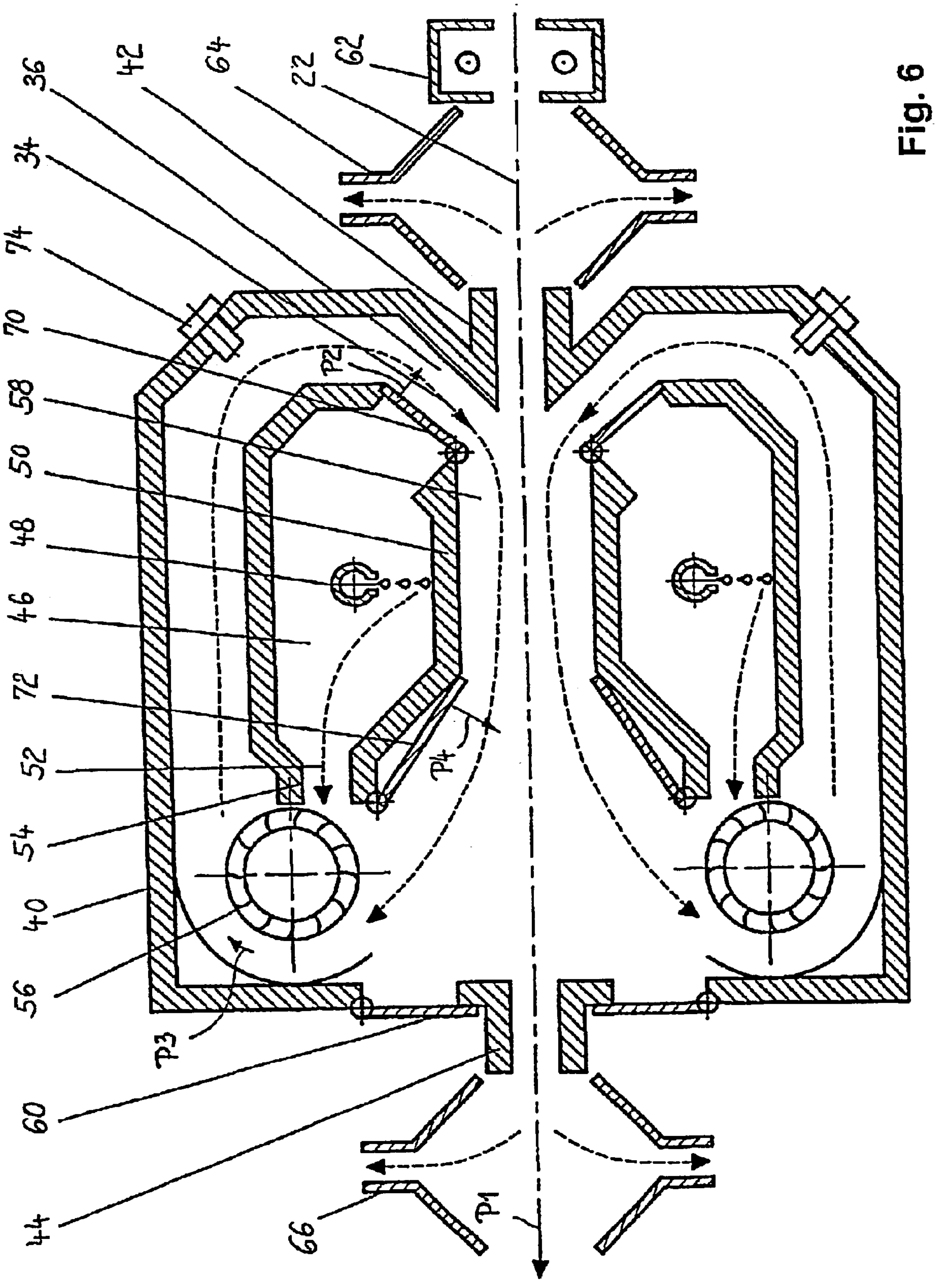
FIG. 6 is a preferred exemplary embodiment wherein the carrier material is blown from above and below.

FIG. 6 shows a preferred exemplary embodiment [of the invention] wherein toner images can be fixed on both sides of the carrier material 22, the fixing chamber comprising a solvent charging system which charges the toner image with a solvent vapor. The fixing chamber is symmetrically constructed relative to the carrier material web 22. Components are explained below that are required for the fixing of the toner images present on the upper side of the carrier material web 22. An evaporator 46 to which liquid solvent is supplied via a delivery tube 48 is arranged inside the fixing chamber 40. The solvent drips onto a heated plate 50 as a healing system whose temperature lies above the boiling point of the solvent, for example 30° C. above the boiling point. In order to improve the evaporation process, the plate 50 can be chemically or mechanically roughened or can be provided with channels. The generated vapor stream 52 escapes via an opening 54. This opening 54 can be designed as a slot or as a nozzle. In a preferred exemplary embodiment, the opening 54 is designed as a valve, and preferably as a solenoid valve. The escape of the vapor stream 52 can be controlled by design, with a clocked opening and closing of the valve.

Alternatively, the delivery of the solvent can also ensue with a nozzle. This nozzle (not shown) generates a finely atomized jet of solvent that is sprayed onto the heated plate 50.

The vapor stream 52 escaping from the evaporator 46 is supplied to the suction side of a cross current ventilator 56 as an acceleration device that is designed as a radial ventilator. The speed of the cross current ventilator 56 can be regulated in order to set the flow velocity of the stream 34 composed of a mixture of air and solvent vapor. With the assistance of the gap nozzle 36, the stream 34 is directed onto the carrier material 22 obliquely in the transport direction P1 of the carrier material 22. The directed stream 34 is then guided along a channel 58 along the carrier material 22 and is extracted by the cross current ventilator 56 at the end of the channel 58 in order to be compressed to form a directed stream 34 mixed anew with the fresh vapor stream 52. The flow velocity of the stream 34 generally amounts to a multiple of the transport velocity of the carrier material 22. In this way, the same part of the stream 34 with the solvent vapor can repeatedly act on the toner images on the carrier material 22 within an influencing time that is defined by the length of the channel 58 and by the transport velocity.

The solvent vapor responsible for the dissolving of the toner material is supplied to the toner material in the toner images in a circulation upon continuous circulation of the solvent vapor. The continuous circulation of the solvent produces a homogenization of the solvent concentration within this circulation and, thus, a homogenization of the fixing of the toner images on the carrier material 22. Blowing a directed stream 34 against the carrier material 22 accelerates the fixing event, so that a lower solvent concentration suffices for the fixing, or solvents having reduced dissolving power can be employed.

According to the exemplary embodiment according to FIG. 6, the gap nozzle 36 generates a stream 34 that obliquely impinges the carrier material 22. Due to the oblique positioning of the gap nozzle 36, an under-pressure or, respectively, a constant pressure is produced in the region of the admission gap 42. The entry of air due to the transport motion of the carrier material 22 can thus be minimized by means of a skillful selection of the angle of incidence of the gap nozzle 36.

In the example of FIG. 6, components of the directed stream 34 and of the transport direction P1 are isodirectional. Such an arrangement is referred to as a co-current flow principle. The arrangement can also be designed such that components of the stream 34 and of the transport direction P1 are opposite one another. This arrangement is referred to as a counter-current principle.

When the carrier material 26 carries toner images on only one side, for example the upper side, then the component parts for fixing toner images of the lower side can be foregone, i.e. the component parts such as the evaporator, the cross current ventilator, etc., that are arranged under the carrier material in FIG. 6.

The arrangement according to FIG. 6 can be designed such that combustible solvents that require device-oriented safety measures in the framework of explosion protection can be utilized. An explosion flap 60 that opens given increased pressure is thus arranged in the region of the discharge gap 44. The carrier material 22 is electrostatically discharged by means of ionized air with the assistance of a discharge device 62. All ignition sources within the fixing chamber 40 are avoided. All parts of the apparatus are grounded in order to avoid static charging. A respective extraction device 64, 66 that extracts the solvent vapor escaping from the fixing chamber 40 in slight amounts is arranged in the proximity of the admission gap 42 and of the discharge gap 44. Accordingly, no concentrations of solvent vapors that are explosive or harmful to health can occur outside of the fixing chamber, even given longer operation.

The arrangement according to FIG. 6 is also designed for a fast start/stop behavior. Two control flaps 70, 72 are provided for this purpose, these being shown in the enable position in FIG. 6. In this position, the stream 34 can flow freely. Both control flaps 70, 72 can be swiveled into a deflection position according to the swiveling directions P2, P4, so that the carrier material 22 no longer has solvent vapor blown against it. For immediate interruption of the fixing process, the control flaps 70, 72 are moved into the deflection position. At the same time, the delivery of solvent via the delivery pipe 48 is stopped for the evaporation process, and the extraction device 66 is turned off. The other extraction device 64 then suctions fresh air into the fixing chamber 40 and the channel 58, and thus the region around the carrier material 22 is flooded with fresh air. The fixing process is suddenly interrupted by means of these measures.

Upon resumption of the printing operations and the further transport of the carrier material 22, the fixing process is restarted by swiveling the control flaps 70, 72 opposite the directions P2, P4. At the same time, the extraction device 66 is re-activated and the admission of solvent for the evaporator 46 is started.

In certain printing processes, the carrier material 22 is retracted in the direction of the printing unit opposite the direction P1 before the resumption of the printing operations. In this case, the control flaps 70, 72 are not returned into the enable position until unfixed toner images are again situated in the blowing location in the channel 58. What is thus achieved is that toner images that have already been fixed need not undergo the fixing process again.

A sensor that measures the solvent concentration is connected into the circulation with solvent vapor. As shall be explained in greater detail later, the solvent concentration is regulated to a constant value with the assistance of this sensor 74.

In the delivery of solvent into the circulation for solvent vapor and in the guidance of the solvent vapor in the circulation, care must be exercised to see that no larger drops of solvent that could fall onto the carrier material 22 form anywhere due to condensation. For this reason, all walls in the fixing chamber that come into contact with the solvent vapor are heated. The temperature of these walls is set such that it at least has the temperature of ebullition of the solvent or lies above this.

Figure 7:
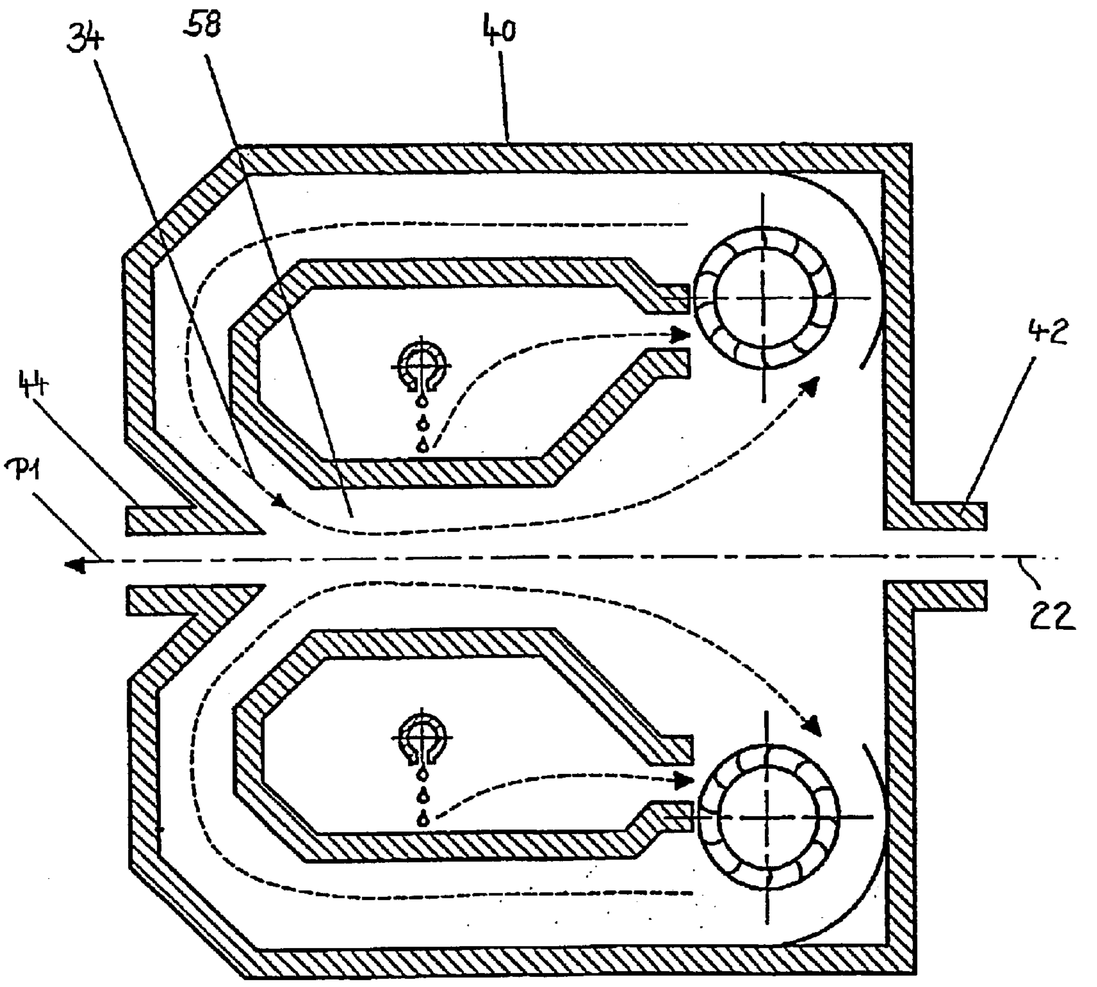
FIG. 7 is an exemplary embodiment wherein the counter-current principle is realized.

FIG. 7 shows an example of a fixing mechanism similar to FIG. 6. However, the counter-current principle is realized here, i.e. the stream 34 with solvent vapor is directed opposite the transport direction P1 of the carrier material 22.

Figure 8:
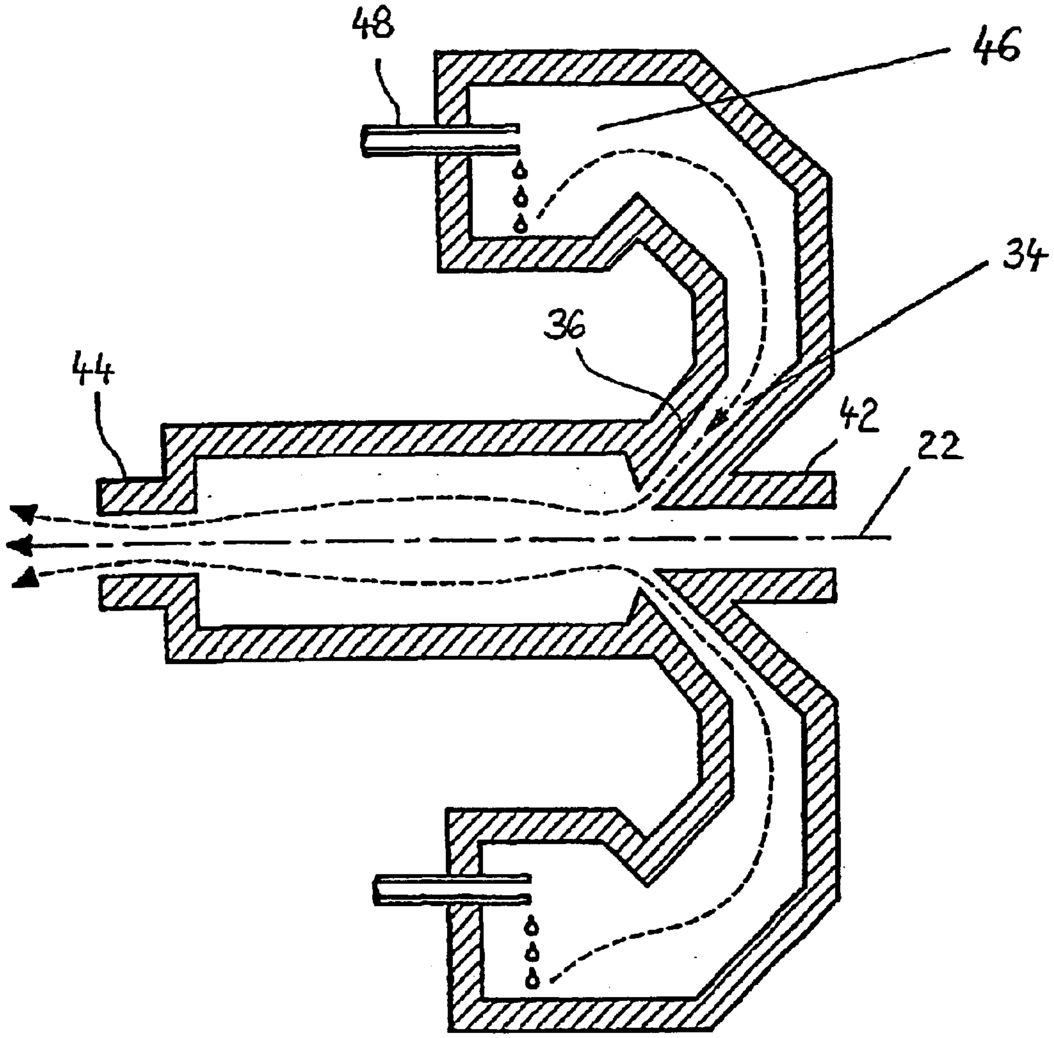
FIG. 8 shows the generation of the directed stream by expansion of the evaporating solvent.

FIG. 8 shows another version of the invention. In this version, the expansion of the evaporating solvent is utilized in order to generate a directed stream 34 that contains solvent vapor. Liquid solvent is supplied to the evaporator 46 via the delivery pipe 48. The nozzle 36 generates the directed stream 34 that blows against the carrier material 22.

The flow velocity and the volume stream are dependent on the quantity of solvent evaporated. A gap nozzle is also preferably employed here as nozzle 36. However, it is also possible—and this is also true of the other example—to have the solvent vapor flow out from a plurality of small round nozzles that are attached over the width of the carrier material 22. In the example of FIG. 8, the carrier material 22 does not have a vapor stream circulation blowing multiply against it.

Figure 9:
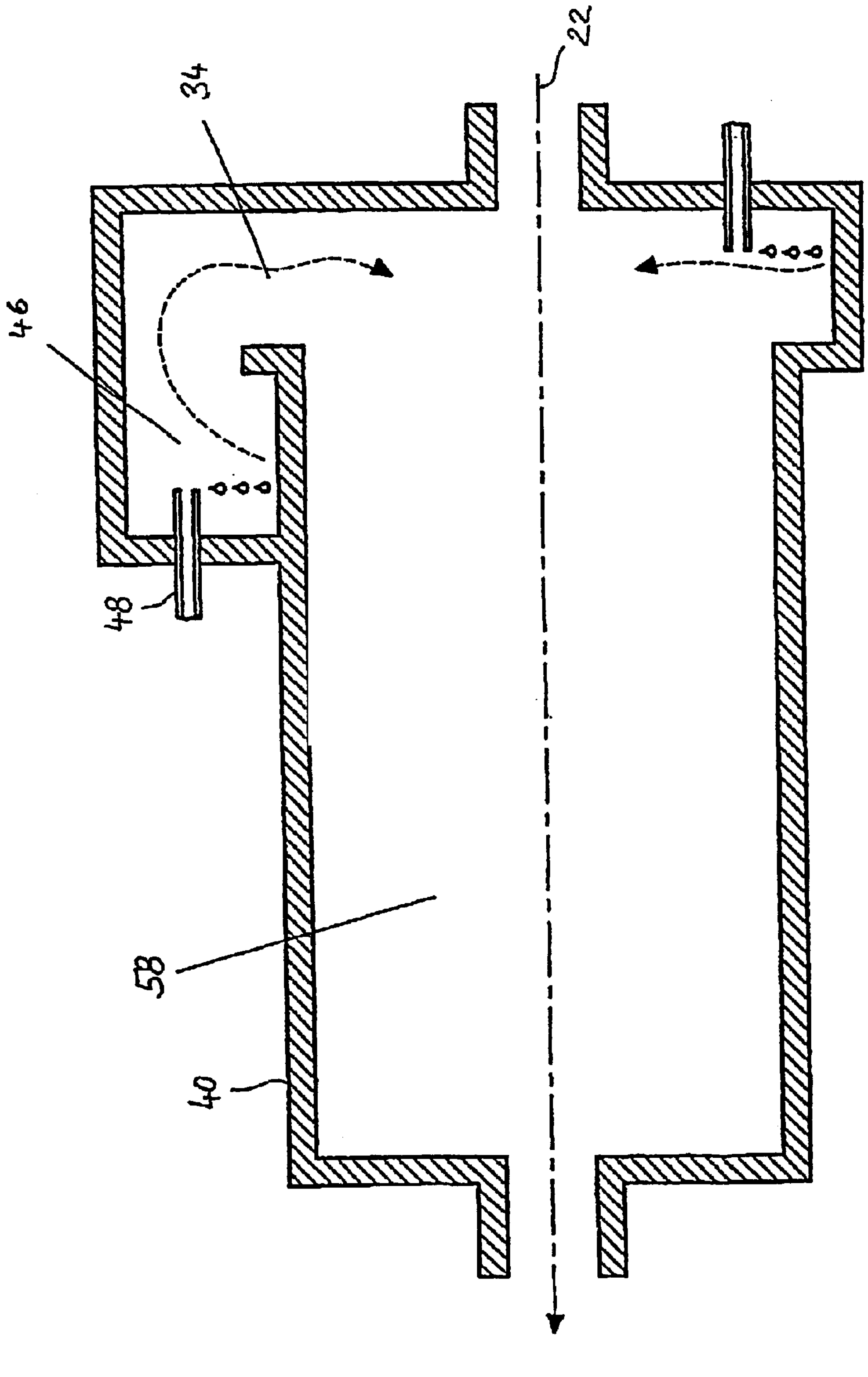
FIG. 9 is a simplified version according to FIG. 8.

FIG. 9 shows a further version of a fixing device of the invention wherein a directed stream 34 is generated on the basis of the expansion during the evaporation of the solvent. This stream 34 is directed onto the carrier material 22 only once. The version according to FIG. 9 is suited for low transport speeds of the carrier material 22.

Figure 10:
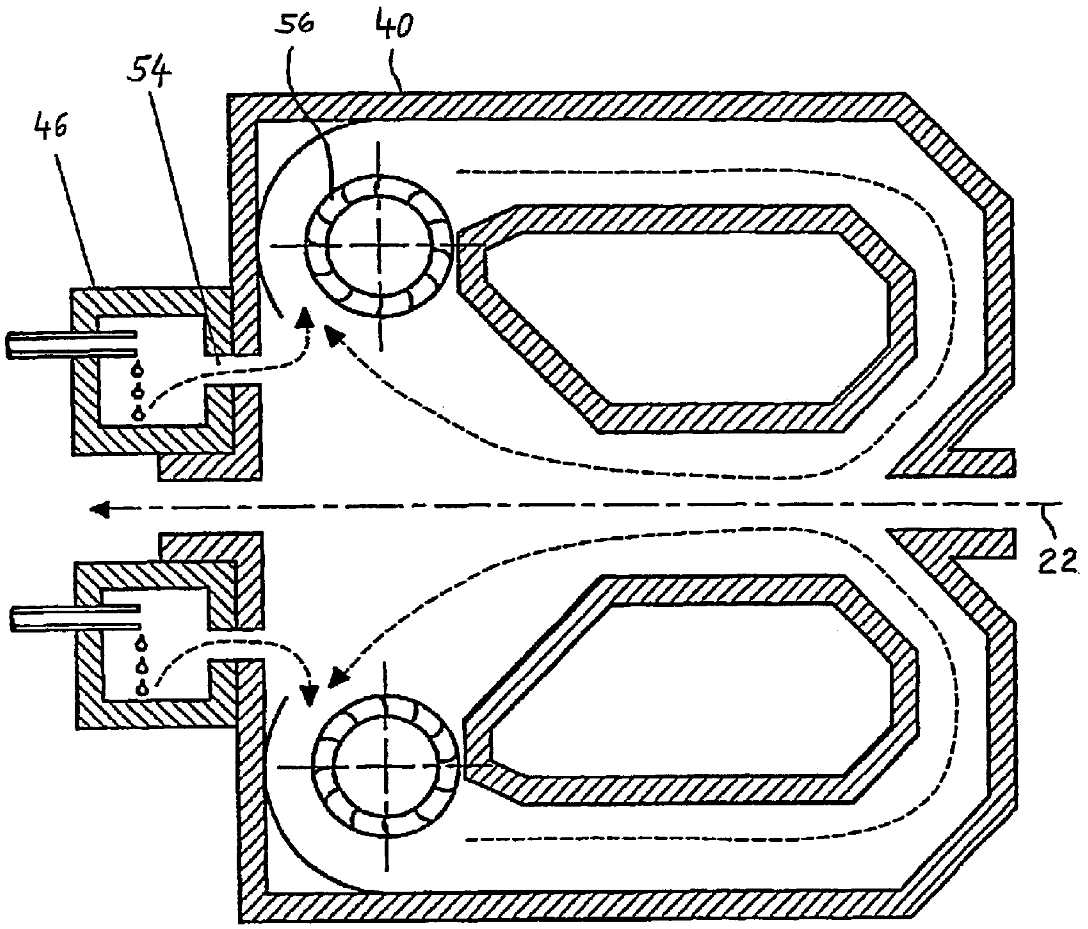
FIG. 10 is an example with evaporator chambers that are arranged outside the fixing chamber.

FIG. 10 shows a further version wherein the evaporator 46 is arranged outside the fixing chamber 40. The opening 52 is gap-shaped and is located in the proximity of the cross current ventilator 56 at the suction side thereof. The opening 54, however, can also have other embodiments. Expressed in general terms, the introduction point for the fresh vapor into the circulation can be situated at an arbitrary point of the circulation.

Figure 11:
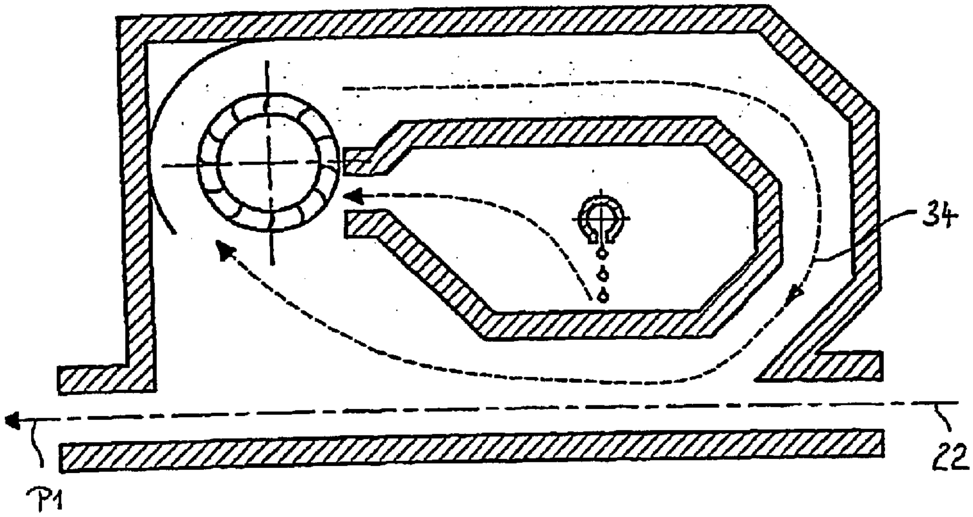
FIG. 11 is an exemplary embodiment wherein the carrier material is charged with a directed stream from only one side.

FIG. 11 shows an exemplary embodiment for simplex printing. The fixing process with the directed stream 34 only takes effect on one side of the carrier material 34. The co-current flow principle is applied in the example according to FIG. 11, whereby the stream 34 proceeds in the direction P1 of the transport of the carrier material 22.

Figure 12:
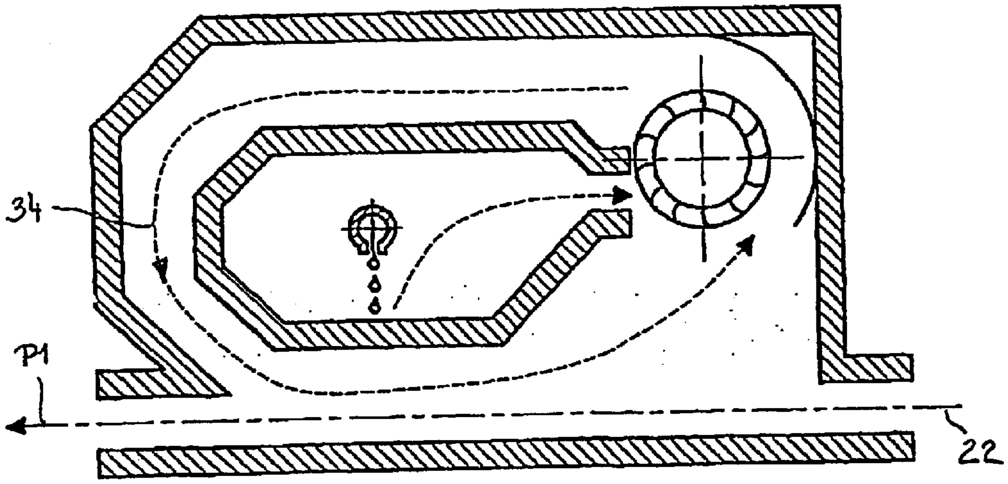
FIG. 12 is the example according to FIG. 11 but with the counter-current principle realized therein.

FIG. 12 shows the example of FIG. 11 with a counter-current principle, whereby the stream 34 proceeds opposite the transport direction P1.

Figure 13:
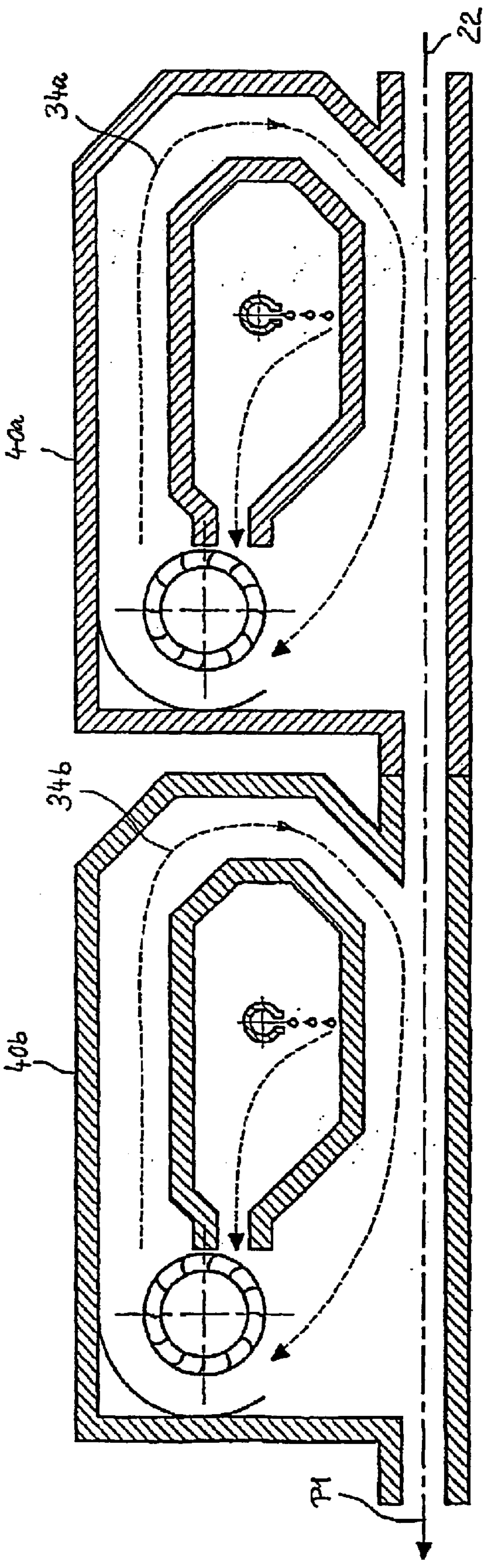
FIG. 13 shows two series-connected fixing chambers.

FIG. 13 shows an example wherein two circulations with streams 34*a* and 34*b* are successively generated. Both stream 34*a*, 34*b* act on the same side of the carrier material 22. The streams 34*a* and 34*b* are generated in two series-connected fixing chambers 40*a*, 40*b*. The synchronous principle is applied in both chambers chamber 40*a*, 40*b*.

Figure 14:
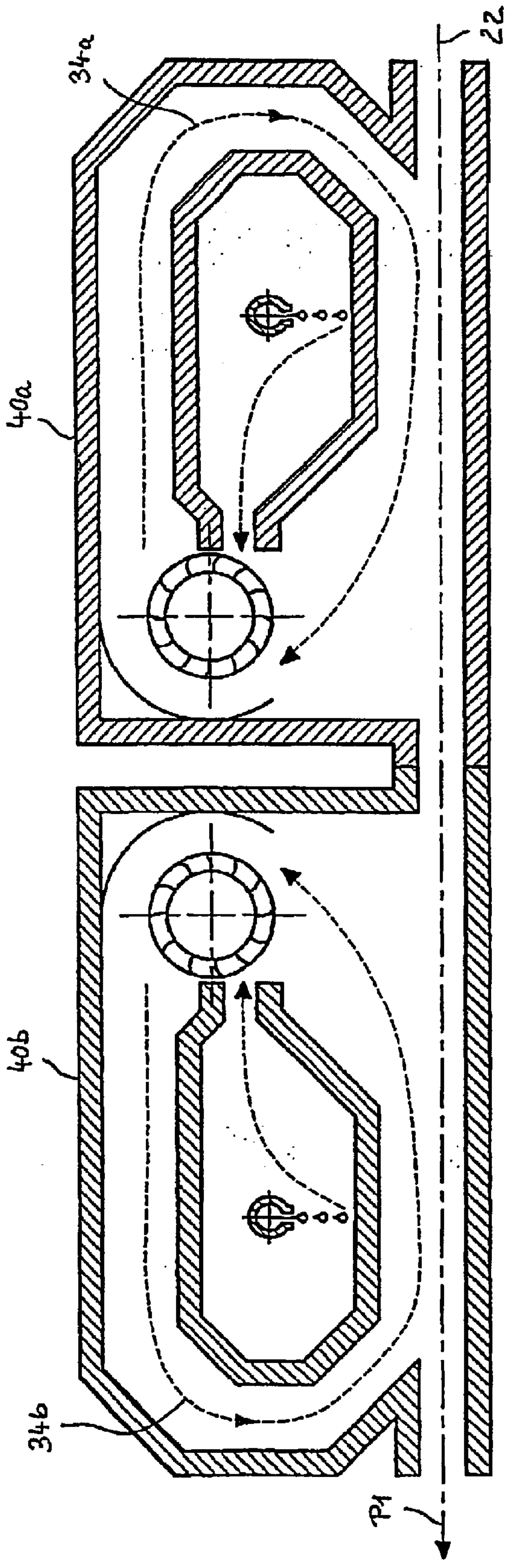
FIG. 14 is the example according to FIG. 13, whereby the co-current flow principle is realized in one chamber and the counter-current principle is realized in the other chamber.

FIG. 14 shows an example similar to FIG. 13. The co-current flow principle is applied in the chamber 40*a* and the counter-current principle is applied in the chamber 40*b*.

Figure 15:
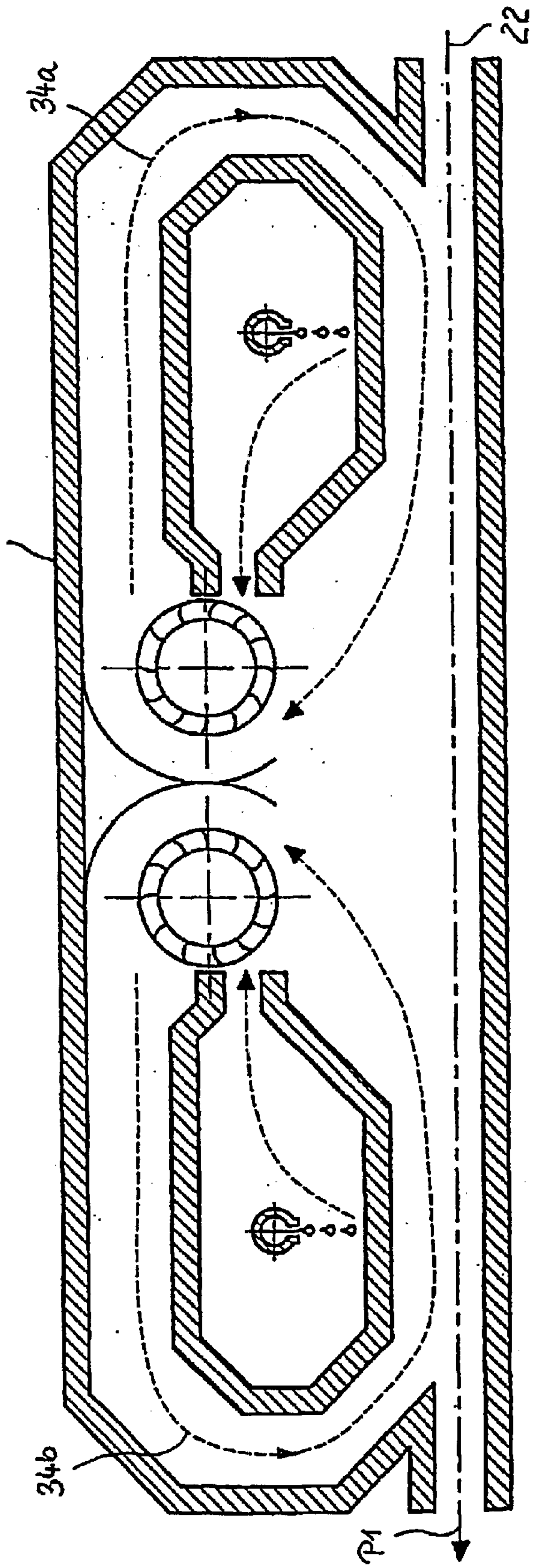
FIG. 15 shows two series-connected circulations with solvent vapor in a single chamber.

FIG. 15 shows another example similar to that of FIG. 14, whereby, however, the streams 34*a* and 34*b* are generated in a single fixing chamber 40. The combined co-current/counter-current principle according to the example of FIG. 14 is retained.

Figure 16:
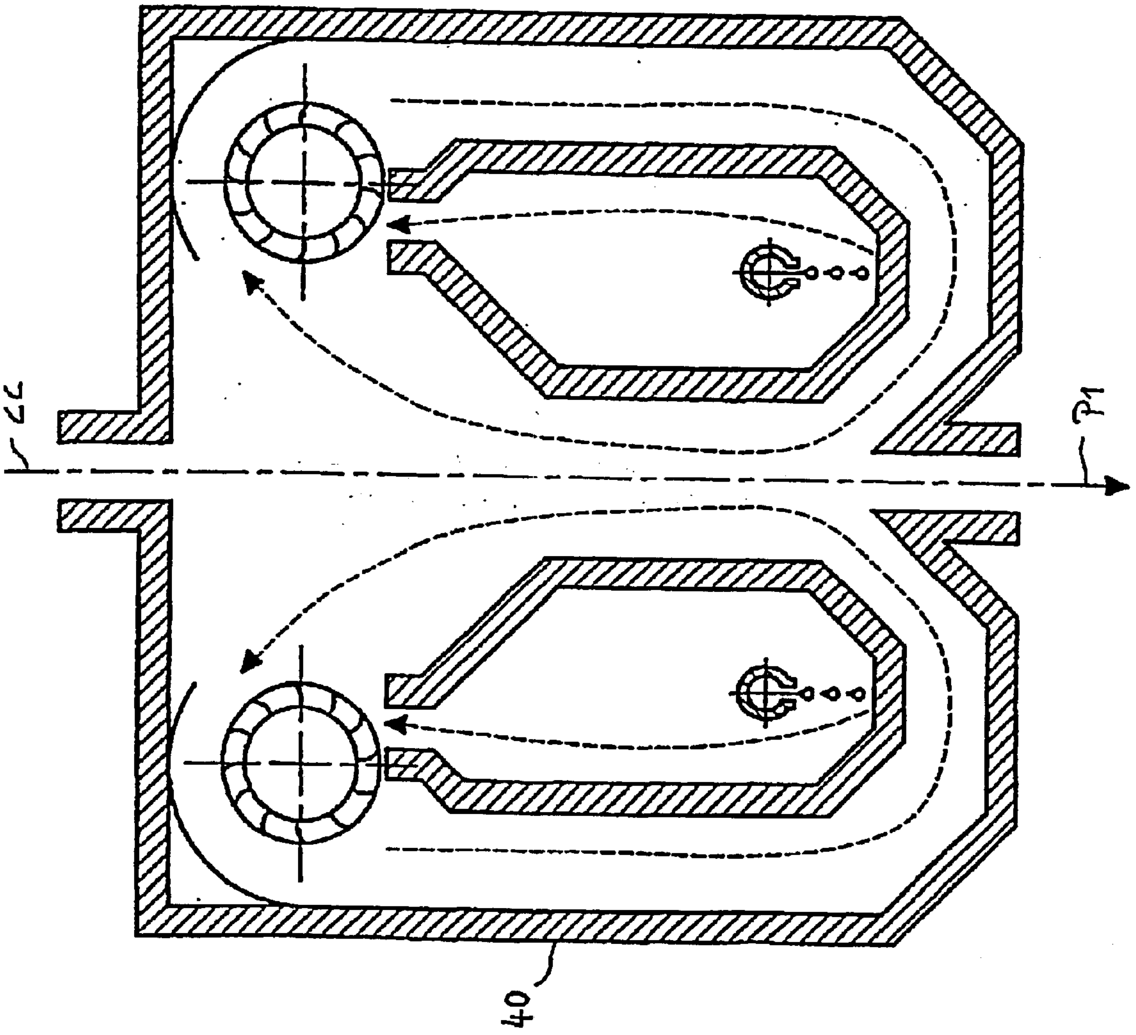
FIG. 16 is an embodiment wherein the carrier material is vertically conducted through the fixing chamber.

FIG. 16 shows an embodiment wherein the carrier material 22 is vertically conducted through the fixing chamber 40. As a consequence of the forced flow, the fixing process—expressed in general terms—is independent of the transport direction of the carrier material. Greater degrees of freedom thus derive in the design and the incorporation of the fixing device in a printer or copier.

Figure 17:
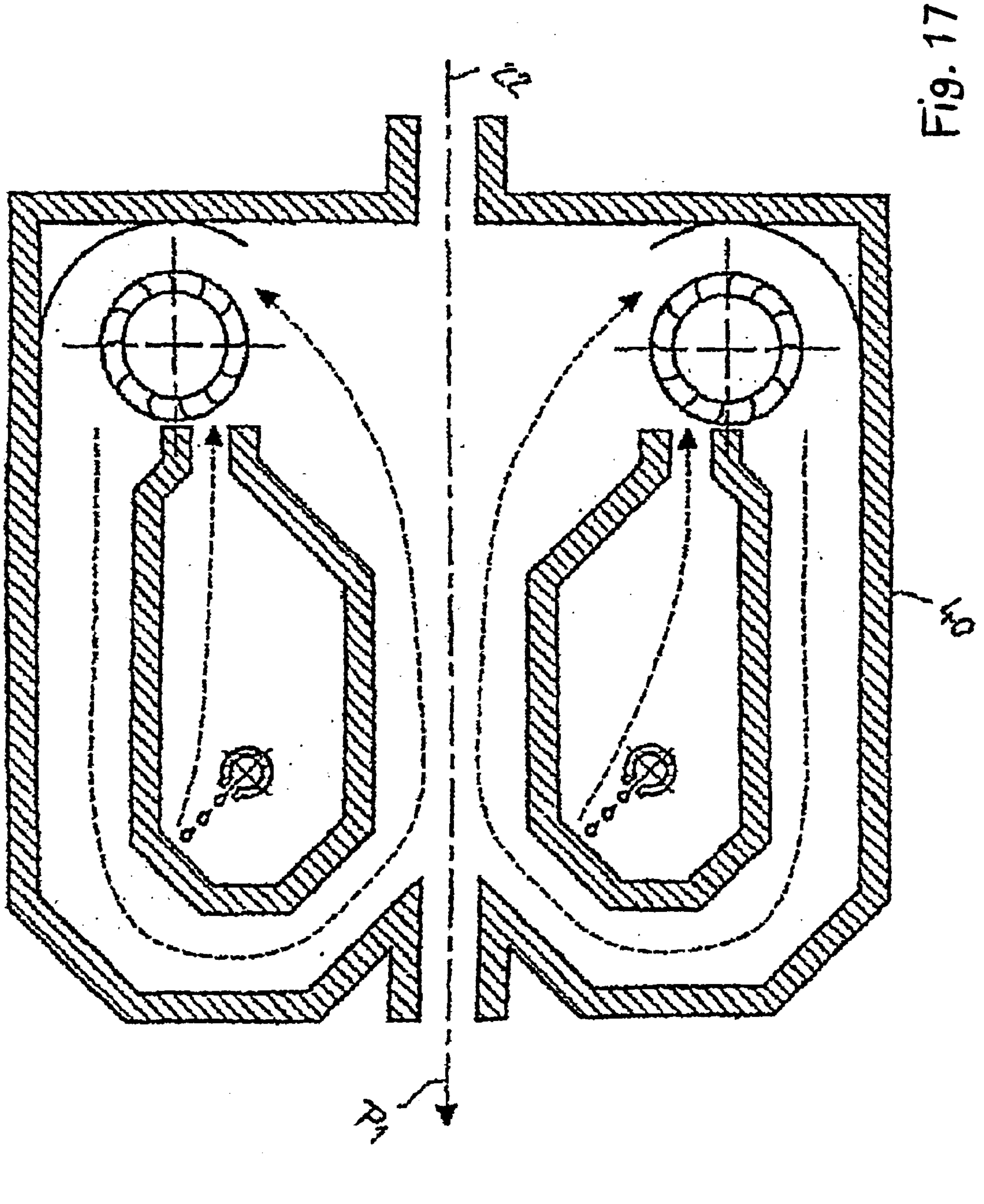
FIG. 17 is an exemplary embodiment wherein the carrier material is conducted through the fixing chamber at an angle of 45°.

FIG. 17 shows an example wherein the carrier material 22 is conducted through the fixing chamber 40 at an angle of approximately 400.

Figure 18:
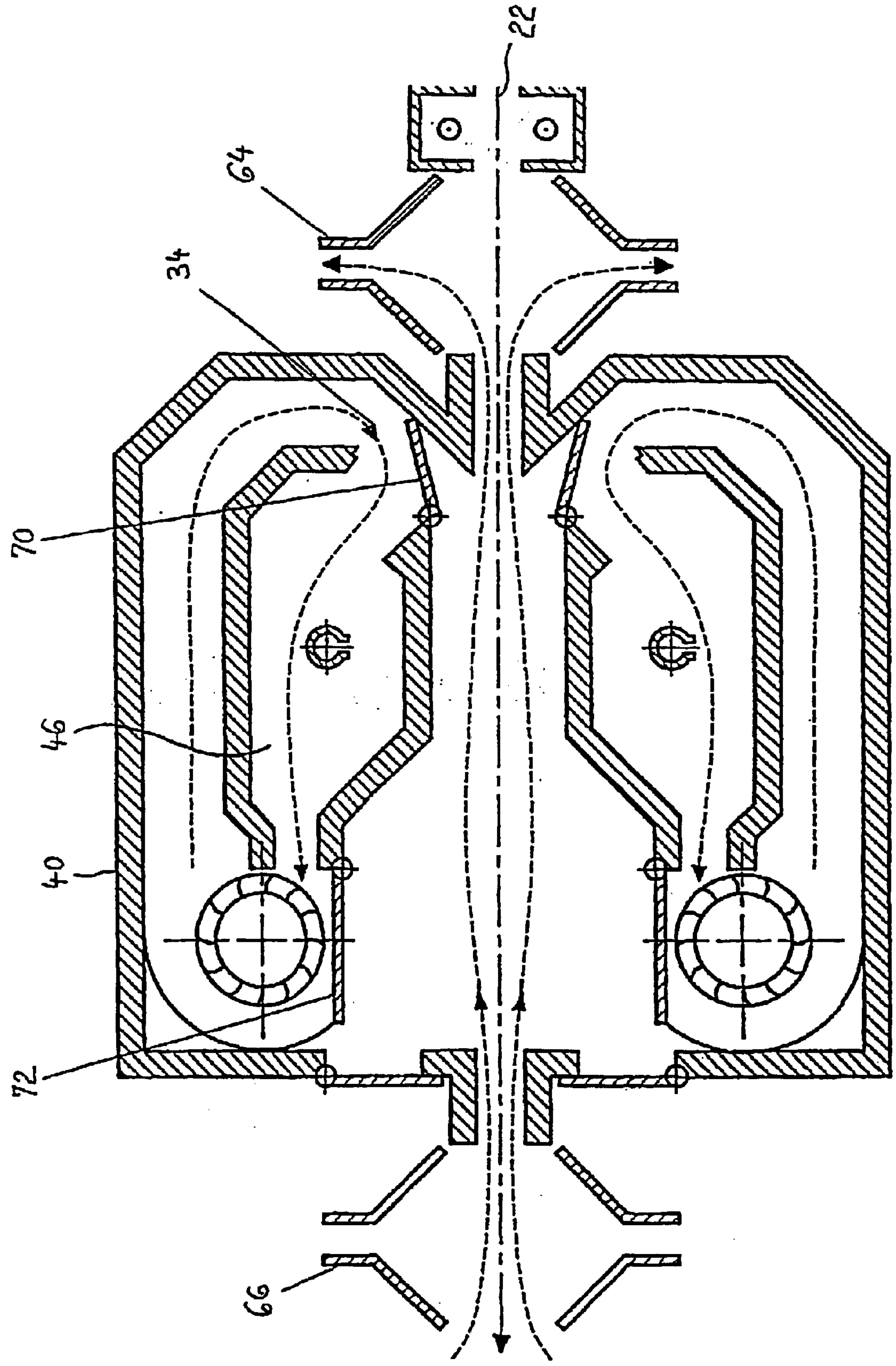
FIG. 18 shows the exemplary embodiment according to FIG. 6, whereby the control flaps are pivoted into the deflection position.

FIG. 18 shows the exemplary embodiment according to FIG. 6, whereby the control flaps 70 and 72 are swiveled into the deflection position. The stream 34 is deflected with the assistance of these control flaps 70, 72 such that it no longer blows against the carrier material 22. At the same time, the delivery of solvent into the evaporator 46 is stopped and the extraction device 66 is turned off. The extraction device 64 that continues to operate then suctions fresh air into the fixing chamber 40, as a result whereof the carrier material 22 is flooded with fresh air. The fixing process is instantly interrupted by means of these measures. For resuming the fixing operations, the control flaps 40, 72 are swiveled back into a position as entered in FIG. 6. At the same time, the extraction device 66 is activated and the solvent delivery into the evaporator 46 is started.

Figure 19:
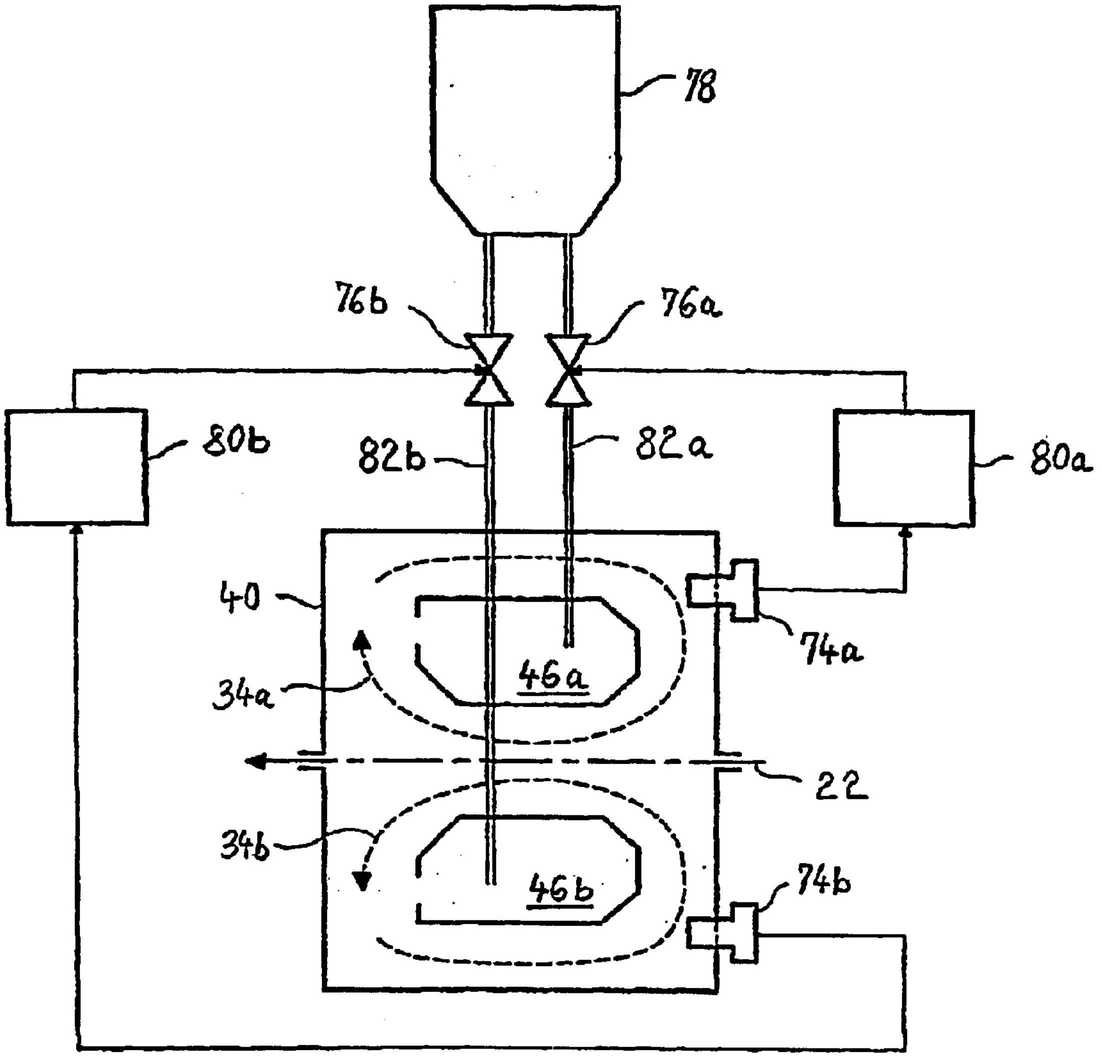
FIG. 19 is an exemplary embodiment with further control elements.

FIG. 19 shows the fixing device according to FIG. 6 with further control elements. As a result of the steady dragging of air into the fixing chamber 40 that cannot be completely prevented due to the movement of the carrier material 22, solvent must be constantly replenished during the fixing operations in order to maintain the solvent concentration. The sensors 74*a* and 74*b* serve for detecting the solvent concentration, these sensors acquiring the concentration above the carrier material 22 on the one hand and under the carrier material 22 on the other hand. The signals of the sensors 74*a*, 74*b* proceed to regulators 80*a*, 80*b* that act on solenoid valves 76*a*, 76*b* that are connected into the admission lines 82*a*, 82*b* for the solvent. In the open condition of the solenoid valves 76*a*, 76*b*, solvent proceeds from a reservoir 78 to the evaporator chamber 46*a*, 46*b*. The regulators 80*a*, 80*b* set the opening times of the solenoid valves 76*a*, 76*b* such that the solvent concentration in the stream 34*a* or 34*b* has a constant value.

The advantages of the fixing device of the invention shall be summarized again on the basis of the described exemplary embodiments. The illustrated fixing devices make it possible to fix toner images on the carrier material contact-free. The toner image as well as the carrier, for example sensitive paper, are not damaged and no pressure points and no stripping or crushing of the toner arise. Further, wear parts as required, for example, in the form of the fixing drums given heat-pressure fixing, are eliminated.

The fixing device enables an intermittent operation since a fast start/stop mode can be realized. The structural size of the fixing device is relatively small compared to traditional fixing devices and comparable transport speeds, for example transport speeds above 1 m/s. Due to the circulation of the solvent vapor and of the directed stream, a very homogeneous fixing image is achieved.

The fixing process is improved by blowing the carrier material with solvent vapor and, in particular, due to the circulation principle, so that less solvent given reduced consumption is required. An environmentally safe solvent with reduced dissolving power can likewise be employed, whereby the transport speed can be high, i.e. above 1 n/s. The degree of softening of the toner material can be influenced by the solvent concentration in the fixing chamber. The degree of penetration of the toner into the paper can thus be controlled. For specific demands, for instance increased document security, the fixing device of the invention makes it possible to achieve such a great penetration of the toner into the carrier material that this toner can only be removed from the carrier material with great expense or cannot be removed therefrom at all.

Given the recited fixing process, the fixing is largely independent of the thickness of the carrier material; for example, thin and thick papers can be processed. Due to the low temperature prevailing in cold fixing, a low thermal stress derives, so that heat-sensitive carrier materials such as, for example, films and labels can be employed.

During fixing in the fixing chamber, the carrier material is only slightly heated, so that it is not dehumidified or hardly dehumidified. Changes in moisture are thereby avoided and disadvantageous effects such as ripple, bagging or curling of the carrier material do not occur. Toners having different colors can be simultaneously fixed with the assistance of the described fixing devices.

The fixing device allows halogen-free solvents to be preferably employed such as, for example, ethyl acetate, acetone, isopropanol, n-propanol. The solvent can be single-phase, as a result of which the condensation and processing of the solvent vapors that emerge from and are extracted from the fixing chamber are very simple in the framework of a recovery. As a result of this recovery and re-employment of the solvent, the overall solvent consumption can be reduced further.

Toner having an arbitrary polymer basis such as, for example, on the basis of polystyrol, polyester and others can be utilized. There is generally a suitable solvent for each of these polymers.

While a preferred embodiment has been illustrated and described in detail in the drawings and foregoing description, the same is to be considered as illustrative and not restrictive in character, it being understood that only the preferred embodiment has been shown and described and that all changes and modifications that come within the spirit of the invention both now or in the future are desired to be protected.

We claim as our invention:

1. An apparatus for fixing a toner image on a carrier material, comprising:

a fixing chamber having a charging system which charges the toner image with a solvent vapor via a directed stream containing the solvent vapor;

said charging system comprising a nozzle directing the stream onto a section of the carrier material; and walls of the fixing chamber which come into contact with the solvent vapor being heated to a temperature that is at least equal to or higher than a temperature of ebullition of a liquid solvent used to form said solvent vapor.

2. The apparatus according to claim 1 wherein an acceleration device is provided which generates the stream containing the solvent vapor.

3. The apparatus according to claim 2 wherein a cross-current ventilator is provided as the acceleration device.

4. The apparatus according to claim 1 wherein a portion of the solvent vapor not absorbed by the carrier material and the toner image is enriched with a predetermined quantity of freshly evaporated solvent and recirculated back to the nozzle and a portion of the evaporated solvent which exits from the fixing chamber being extracted by an extraction device.

5. The apparatus according to claim 1 wherein the carrier material is web-shaped paper.

6. The apparatus according to claim 1 wherein the carrier material is transported in non-contacting fashion in a region in which it receives the solvent vapor.

7. The apparatus according to claim 1 wherein the carrier material is electrostatically discharged with assistance of a discharge device before it receives the solvent vapor.

8. The apparatus according to claim 1 wherein the stream of solvent vapor is directed in a moving direction of the carrier material.

9. The apparatus according to claim 1 wherein the stream of solvent vapor is directed opposite a moving direction of the carrier material.

10. The apparatus according to claim 1 wherein the stream of solvent vapor is guided along a channel section having a defined length and within which the solvent vapor acts on the toner image and on the carrier material.

11. The apparatus according to claim 1 wherein a gap nozzle is provided as said nozzle.

12. The apparatus according to claim 1 wherein a heated plate onto which the liquid solvent is dripped is provided for evaporation of the solvent.

13. The apparatus according to claim 12 wherein the solvent is supplied by a delivery pipe; and the heated plate is at least one of roughened and provided with channels.

14. The apparatus according to claim 12 wherein the solvent is supplied to the heated plate with assistance of a spray nozzle that sprays the solvent.

15. The apparatus according to claim 1 wherein at least one valve controls flow of the solvent from a reservoir.

16. The apparatus according to claim 15 wherein the valve is driven such that a predetermined concentration of solvent is maintained in the stream of the solvent vapor.

17. The apparatus according to claim 15 wherein at least one sensor is provided that measures the solvent concentration in the stream of solvent vapor; and the concentration of the solvent is regulated by control of a solenoid valve.

18. The apparatus according to claim 1 wherein a vapor stream valve is provided that regulates delivery of the solvent vapor from an evaporator.

19. The apparatus according to claim 1 wherein the fixing chamber is secured by at least one explosion flap.

20. The apparatus according to claim 1 wherein the carrier material is guided in the fixing chamber via an admission gap and a discharge gap; and a respective extraction device which extracts at least a portion of the solvent vapor is provided at the admission gap and at the discharge gap.

21. The apparatus according to claim 1 wherein at least one control flap is provided with which the stream of solvent vapor is deflected in a deflection position such that the carrier material no longer has solvent vapor blown against it.

22. The apparatus according to claim 21 wherein for immediate interruption of fixing, the control flap is driven into the deflection position.

23. The apparatus according to claim 1 wherein given a stop of forward transport of the carrier material, fixing is also stopped.

24. The apparatus according to claim 1 wherein given resumption of transport of the carrier material, a control flap is swiveled from a deflection position into an enable position for the stream of solvent vapor.

25. The apparatus according to claim 1 wherein the carrier material inside the fixing chamber is simultaneously respectively charged from both sides with a respective directed stream of the solvent vapor.

26. The apparatus according to claim 1 wherein an evaporator for generating the solvent vapor is arranged outside the fixing chamber.

27. The apparatus according to claim 1 wherein the carrier material as viewed in a transport direction is successively charged by a first stream containing the solvent vapor and then by a second stream containing the solvent vapor.

28. The apparatus according to claim 27 wherein the first stream and the second stream are identically directed.

29. The apparatus according to claim 27 wherein the first stream and the second stream are directed opposite one another.

30. The apparatus according to claim 27 wherein both streams are generated in a single chamber.

31. The apparatus according to claim 27 wherein each stream is generated in a chamber.

32. The apparatus according to claim 1 wherein the solvent has a low ozone potential.

33. The apparatus according to claim 1 wherein the solvent is single-phase.

34. The apparatus according to claim 1 wherein one of ester, ketone, and alcohol is employed as said solvent.

35. The apparatus according to claim 1 wherein a toner comprising polystyrol is employed.

36. An apparatus for printing and/or copying, comprising:

a band-shaped carrier material printed with toner images on at least one side; and a fixing chamber for fixing the toner image on the carrier material, said fixing chamber having a charging system which charges the toner image with a solvent vapor via a directed stream containing the solvent vapor, said charging system comprising a nozzle directing the stream onto a section of the carrier material, and walls of the fixing chamber which come into contact with the solvent vapor being heated to a temperature that is at least equal to or higher then a temperature of ebullition of a liquid solvent used to form said solvent vapor.

37. A method for fixing a toner image on a carrier material, comprising the steps of:

charging a toner image with a solvent vapor by generating and directing an air stream containing the solvent vapor onto a section of the carrier material with the assistance of a nozzle; and heating walls of a fixing chamber which come into contact with the solvent vapor to a temperature that is at least equal to or higher then a temperature of ebullition of a liquid solvent used to form said solvent vapor.

38. The method according to claim 37 wherein an acceleration device is provided for generating the stream containing the solvent vapor.

39. The method according to claim 37 wherein a portion of the solvent vapor not absorbed by the carrier material and the toner image is enriched with a predetermined quantity of freshly evaporated solvent and then recirculated back to the nozzle, and wherein a portion of the solvent vapor escaping from fixing the chamber containing the solvent vapor is extracted by an extraction device.

40. The method according to claim 37 wherein the stream of solvent vapor is directed in a moving direction of the carrier material.

41. The method according to claim 37 wherein the stream of solvent vapor is directed opposite a moving direction of the carrier material.

42. The method according to claim 37 wherein the carrier material inside the fixing chamber is simultaneously respectively charged from both sides with a directed stream of the solvent vapor.

43. The method according to claim 37 wherein the solvent vapor has a low ozone potential.

44. The method according to claim 43 wherein the solvent vapor is single-phase.

45. The method according to claim 37 wherein one of ester, ketone, and alcohol is employed as said solvent vapor.

46. The method according to claim 37 wherein a polystyrol toner is employed.

47. A vapor fixing device for an electrographic printer or copier, comprising:

a heated vapor housing having vapor therein used for fixing a toner image on a carrier material, and walls of said vapor housing which come into contact with the vapor being heated to a temperature sufficiently high so that the vapor does not condense at an interior of housing walls of the housing.

48. The apparatus according to claim 47 wherein a nozzle is provided within the vapor housing directing a stream of the vapor onto a section of the carrier material.

49. A method for vapor fixing a toner image onto a carrier material, comprising the steps of:

providing vapor in a vapor housing; and heating interior walls of the vapor housing which come into contact with the vapor to a temperature sufficiently high so that vapor does not condense at the interior housing walls of the housing.

50. The method according to claim 49 including the step of directing a stream of a vapor against the carrier material to fix the toner image on the carrier material.

* * * * *